US009312980B1

(12) United States Patent
Kakande

(10) Patent No.: US 9,312,980 B1
(45) Date of Patent: Apr. 12, 2016

(54) COMMUNICATION FABRIC FOR A CLUSTER OF NETWORK HOSTS

(71) Applicant: Alcatel-Lucent USA Inc., Murray Hill, NJ (US)

(72) Inventor: Joseph K. Kakande, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/534,854

(22) Filed: Nov. 6, 2014

(51) Int. Cl.
*H04J 14/00* (2006.01)
*H04J 14/02* (2006.01)
*H04B 10/25* (2013.01)
*H04Q 11/00* (2006.01)
*H04B 10/40* (2013.01)

(52) U.S. Cl.
CPC ........ *H04J 14/0279* (2013.01); *H04B 10/2503* (2013.01); *H04Q 11/0001* (2013.01); *H04B 10/40* (2013.01); *H04J 14/0212* (2013.01); *H04J 14/0216* (2013.01)

(58) Field of Classification Search
CPC .... H04B 10/2503; H04B 10/40; H04B 10/43; H04J 14/0279; H04J 14/02; H04J 14/0212; H04J 14/0216; H04J 14/0217; H04J 14/022; H04J 14/0267; H04Q 11/0001; H04Q 11/0005; H04Q 11/0066; H04Q 11/0071; H04Q 2011/0001; H04Q 2011/0005; H04Q 2011/0015; H04Q 2011/0024; H04Q 2011/0039; H04Q 2011/0052
USPC ......................... 398/45, 50, 51, 54
See application file for complete search history.

(56) References Cited

U.S. PATENT DOCUMENTS

| 6,714,742 | B1 | 3/2004 | Hayee et al. | |
|---|---|---|---|---|
| 7,787,460 | B2* | 8/2010 | MacLean et al. | .. H04Q 11/0062 370/392 |
| 8,699,877 | B2* | 4/2014 | Schimpe | ............ H04J 14/0208 398/25 |
| 8,965,203 | B1* | 2/2015 | Vahdat et al. | ........... H04J 14/00 385/16 |
| 9,143,234 | B2 | 9/2015 | Campos | |
| 9,166,724 | B2* | 10/2015 | Yamashita | .......... H04J 14/0212 |
| 2002/0060825 | A1 | 5/2002 | Weigold et al. | |
| 2005/0180749 | A1* | 8/2005 | Koley et al. | ......... H04J 14/0283 398/45 |
| 2012/0155879 | A1 | 6/2012 | Urban | |
| 2014/0119728 | A1* | 5/2014 | Zhang et al. | ........ H04J 14/0204 398/48 |

OTHER PUBLICATIONS

Mohammad, A., et al., "A scalable, commodity data center network architecture," Proceedings of the ACM SIGCOMM 2008 conference on Data communication, Aug. 17-22, 2008, Seattle, WA, USA, pp. 63-74.

(Continued)

*Primary Examiner* — M. R. Sedighian
(74) *Attorney, Agent, or Firm* — Mendelsohn Dunleavy, P.C.; Yuri Gruzdkov

(57) ABSTRACT

We disclose a communication system in which a cluster of network nodes is interconnected using an optical interconnect and an electrical switch engine. A bidirectional communication channel between any two of the network nodes can be set up using two bidirectional optical links established through the optical interconnect and one bidirectional electrical link configured to connect the ends of the two bidirectional optical links through the switch engine. The optical interconnect has a structure that enables the communication system to be (re) configurable for a desired level of oversubscription. Some embodiments of the communication system can advantageously be used in a data-center network.

20 Claims, 6 Drawing Sheets

(56) References Cited

OTHER PUBLICATIONS

Nathan, F., et al., "Helios: a hybrid electrical/optical switch architecture for modular data centers," Proceedings of the ACM SIGCOMM 2010 conference, Aug. 30-Sep. 3, 2010, New Delhi, India, 12 pages.

Wang, G., et al., "Your data center is a router: The case for reconfigurable optical circuit switched paths," In Proc. ACM Hotnets-VIII, New York City, NY. USA., Oct. 2009, pp. 1-6.

Katrinis, K., et al., "SDN control for hybrid OCS/electrical datacenter networks: An enabler or just a convenience?" IEEE Photonics Society Summer Topical, 2013, 2 pages.

Tu, C., "Cloud-Scale Data Center Network Architecture," Taiwan, 2011, pp. Title—51.

"Data Center Network Connect Solutions," HP and Alcatel-Lucent; Sep. 2011, pp. 1-4.

Shamsee, N., "Data Center Networking-Architecture and Design Guidelines" Cisco Systems, Middle East network Operators Group, 2007, 73 pages.

"The Software Defined Hybrid Packet Optical Datacenter Network," Calient Technologies, Oct. 22, 2013, pp. 1-13.

Kakande, J., "Communication Fabric for a Cluster of Network Hosts," U.S. Appl. No. 14/534,840, filed Nov. 6, 2014, pp. 1-34.

\* cited by examiner

600

COMMUNICATION FABRIC FOR A CLUSTER OF NETWORK HOSTS

CROSS-REFERENCE TO RELATED APPLICATIONS

The subject matter of this application is related to that of U.S. patent application Ser. No. 14/534,840, which is incorporated herein by reference in its entirety.

BACKGROUND

1. Field

The present disclosure relates to optical communication equipment and, more specifically but not exclusively, to a communication fabric and method for a cluster of network hosts.

2. Description of the Related Art

This section introduces aspects that may help facilitate a better understanding of the disclosure. Accordingly, the statements of this section are to be read in this light and are not to be understood as admissions about what is in the prior art or what is not in the prior art.

The growth of intra data-center traffic is a well-documented phenomenon. With the proliferation of large data centers to serve cloud-type applications, it is expected that data-center networks capable of supporting traffic loads on the order of Pbit/second will soon be required. Today's data centers are constrained by the interconnection network, and it is increasingly believed that deployment of optical transport technologies in data centers may help to overcome these constrains.

SUMMARY OF SOME SPECIFIC EMBODIMENTS

Disclosed herein are various embodiments of a communication system in which a cluster of network nodes is interconnected using an optical interconnect and an electrical switch engine. A bidirectional communication channel between any two of the network nodes can be set up using two bidirectional optical links established through the optical interconnect and one bidirectional electrical link configured to connect the ends of the two bidirectional optical links through the switch engine. The optical interconnect has a structure that enables the communication system to be (re) configurable for a desired level of oversubscription. Some embodiments of the communication system can advantageously be used in a data-center network.

According to an example embodiment, provided is an apparatus comprising: an optical interconnect having N first ports and M second ports and configured to connect any of the N first ports and any of the M second ports in a manner that supports a respective bidirectional data flow between a pair of connected ports therein, wherein the optical interconnect is configurable to support at most M bidirectional data flows for a subset of the N first ports, where M and N are positive integers, N>M, and M is greater than one; and an electrical switch engine connected to the M second ports of the optical interconnect and configured to electrically connect any of the M second ports and any other of the M second ports in a manner that supports a respective bidirectional data flow between a pair of connected second ports therein. The apparatus is configured to support a bidirectional data flow between any two of the N first ports using a respective communication channel established through the optical interconnect and the electrical switch engine.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
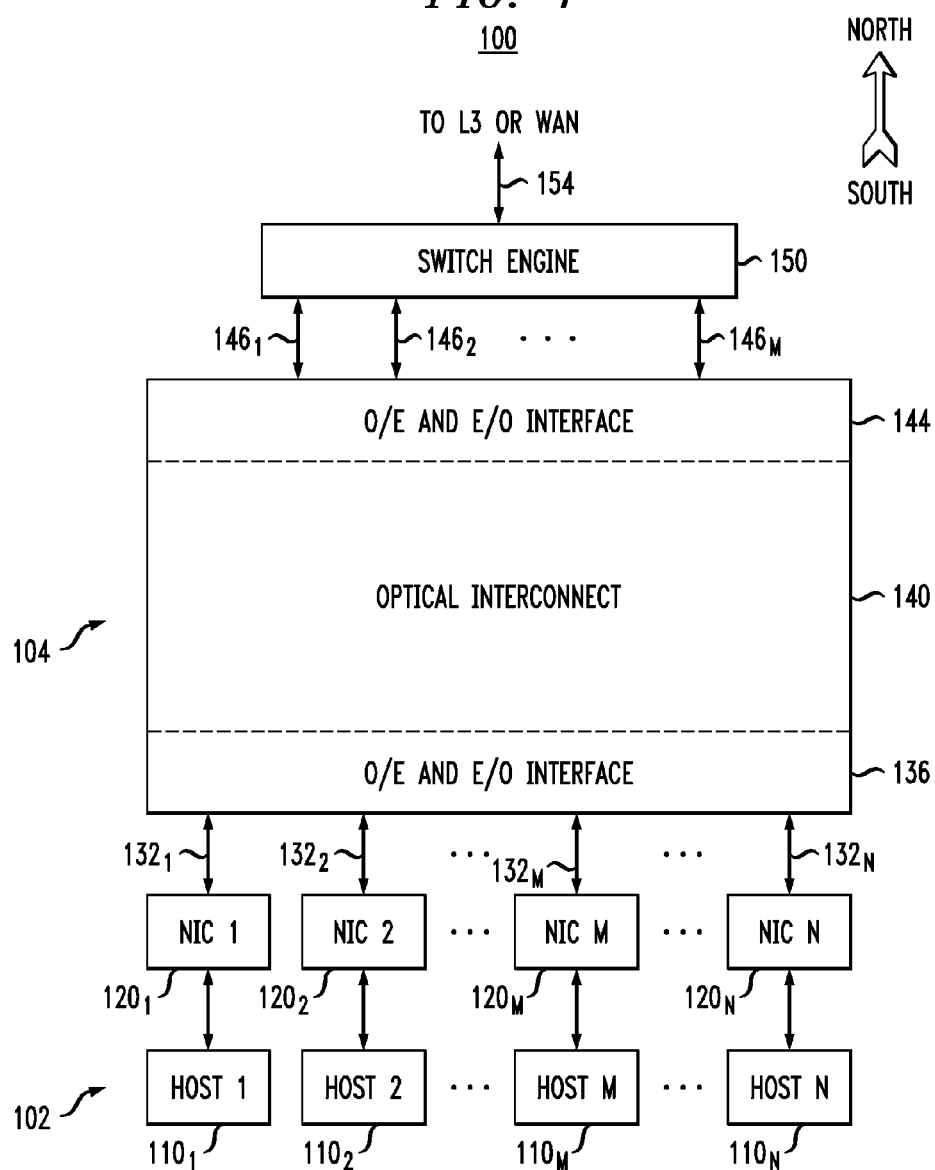
FIG. 1 shows a block diagram of a communication system according to an embodiment of the disclosure.

FIG. 1 shows a block diagram of a communication system 100 according to an embodiment of the disclosure. In an example embodiment, system 100 can be used in a Layer 2 (L2) network of a data center. As used herein, the term "data center" refers to a pool of resources (e.g., computational, storage, communication) interconnected using a communication network. Some of communication-network architectures and the corresponding layered topologies suitable for a data center are reviewed, e.g., in Mohammad Al-Fares, et al., "A Scalable, Commodity Data Center Network Architecture," SIGCOMM'08, pp. 63-74, Aug. 17-22, 2008, Seattle, Wash., USA, which is incorporated herein by reference in its entirety.

In an example embodiment, an L2 network has a scalable architecture and is configured to carry data traffic based on Ethernet technologies. The data forwarding decisions are made, e.g., based on the Ethernet header of a data packet and its corresponding entry in the forwarding table. The routers used in the L2 network may also serve as gateways that connect the L2 network to a Level 3 (L3) network and/or a wide area network (WAN).

System 100 comprises a cluster 102 of network hosts (e.g., servers) 110, each having a respective conventional network interface card (NIC) 120. Cluster 102 is illustratively shown as having N (>3) network hosts 110, which are labeled $110_1$-$110_N$. However, in various alternative embodiments, N can be any positive integer greater than two. Similarly, the integer M used in the indexing of network hosts 110 in FIG. 1 can be any positive integer greater than one but smaller than N. In an example embodiment, each NIC 120 has an associated unique MAC (Medium Access Control) or IP (Internet Protocol) address.

In an example embodiment, system 100 is designed and configured to provide full-duplex connectivity between any M of the N network hosts 110. More specifically, the M communicating network hosts 110 are logically arranged in pairs, with each such pair having a respective bidirectional communication channel established over a communication fabric 104 of system 100. The identity of the M communicating network hosts 110 can change over time, but the total number of the communicating network hosts 110 that can be supported by communication fabric 104 may not exceed M. In other words, at any point in time, system 100 supports the routing and transmission of at most M/2 bidirectional data flows between network hosts 110. This characteristic implies that system 100 has a built-in oversubscription factor of N:M.

As used herein, the term "oversubscription" refers to the ratio of the aggregate bandwidth among the network hosts, such as network hosts 110, to the maximum bisection bandwidth supported by the particular topology/configuration of the corresponding communication system, such as system 100. For example, assuming that all NICs, such as NICs 120, corresponding to the network hosts have the same individual bandwidth, an oversubscription factor of 1:1 indicates a topology/configuration in which all network hosts may potentially establish bidirectional communication channels with the counterpart network hosts over the corresponding communication fabric, such as communication fabric 104. The host pairing may be arbitrary and subject only to contention between some network hosts wanting to communicate with the same counterpart network host. As another example, an oversubscription factor of 5:1 indicates a topology/configuration in which only up to 20% of the network hosts may establish bidirectional communication channels with the counterpart network hosts. Example embodiments of system 100 may be oversubscribed by a factor that is between 2:1 and 10:1. Although an oversubscription factor of 1:1 is theoretically possible, the cost of the corresponding embodiment may be relatively high.

Communication fabric 104 comprises an optical interconnect 140 and a switch engine 150. Optical interconnect 140 comprises a first ("south") input/output interface 136 and a second ("north") input/output interface 144. Interface 136 has N ports $132_1$-$132_N$, each coupled to a respective one of NICs $120_1$-$120_N$ as indicated in FIG. 1. Interface 144 has M ports $146_1$-$146_M$ coupled to switch engine 150. In some embodiments, switch engine 150 may optionally be coupled to an L3 switch or a WAN, as indicated in FIG. 1, via an L3 or WAN port 154.

Both sets of ports of optical interconnect 140, i.e., south ports $132_1$-$132_N$ and north ports $146_1$-$146_M$, are configured to (i) receive and output electrical signals from/to the circuits that are external to the optical interconnect and (ii) receive and output optical signals from/to the circuits that are internal to the optical interconnect. As such, both interfaces 136 and 144 are configured to perform appropriate electrical-to-optical (E/O) and optical-to-electrical (O/E) signal conversions. The optical signals generated by interfaces 136 and 144 are routed through optical interconnect 140 in a manner that, in cooperation with switch engine 150, enables the above-described reconfigurable, oversubscribed connectivity among network hosts $110_1$-$110_N$. Example embodiments of optical interconnect 140 are described in more detail below in reference to FIGS. 2 and 5-6.

Switch engine 150 is configured to operate as a router that can route data packets among various north ports $146_1$-$146_M$ and, optionally, between the north ports and L3 port 154. More specifically, switch engine 150 can electrically route data packets between any port $146_i$ and any port $146_j$, where i≠j. Switch engine 150 can also route data packets between any port $146_i$ and L3 port 154.

For example, to establish a bidirectional communication channel between the i-th network host $110_i$ and the j-th network host 110, communication fabric 104 may be configured to allocate the following routes for the data packets that are being routed between these network hosts: (i) an optical route, through optical interconnect 140, between the i-th south port $132_i$ and the k-th north port $146_k$; (ii) an electrical route, through switch engine 150, between the k-th north port $146_k$ and the m-th north port $146_m$, where m≠k; and (iii) an optical route, through optical interconnect 140, between the m-th north port $146_m$ and the j-th south port $132_j$. The north ports $146_k$ and $146_m$ can be arbitrarily and dynamically selected among ports $146_1$-$146_M$, subject to the availability of idle north ports and appropriate contention-arbitration rules. The maximum data routing capacity is reached when none of north ports $146_1$-$146_M$ is idle. The N:M oversubscription is caused by the fact that there are more south ports 132 than north ports 146.

A data packet sent by NIC $120_i$, on behalf of network host $110_i$, to NIC $120_j$, for network host $110_j$, enters communication fabric 104 through the i-th south port $132_i$. Interface 136 operates to modulate the data packet onto an optical carrier. Optical interconnect 140 then directs the modulated optical carrier to the k-th north port $146_k$. Interface 144 operates to de-modulate the modulated optical carrier to generate a corresponding electrical signal carrying the data packet. Switch engine 150 then directs that electrical signal from the k-th north port $146_k$ to the m-th north port $146_m$, where the data packet re-enters communication fabric 104. Interface 144 operates to modulate the re-entered data packet onto another optical carrier. Optical interconnect 140 then directs that modulated optical carrier to the j-th south port $132_j$. Interface 136 operates to de-modulate the modulated optical carrier received at the j-th south port $132_j$ to generate a corresponding electrical signal carrying the data packet and then applies that electrical signal to NIC $120_j$.

Transmission of a data packet in the opposite direction, e.g., from NIC $120_j$ to NIC $120_i$, is performed in a similar manner.

In some embodiments, any number (e.g., some or all) of the device pairs connected to south ports 132, each consisting of a respective network host 110 and a respective NIC 120, can each be replaced by any other L2 data source, such as an Ethernet switch port. The latter configuration can be realized, e.g., when network hosts are configured to communicate, via their respective NICs, to a top-of-rack Ethernet switch. The switch is then connected to a corresponding south port 132 and serves as a gateway to the corresponding network.

Figure 2:
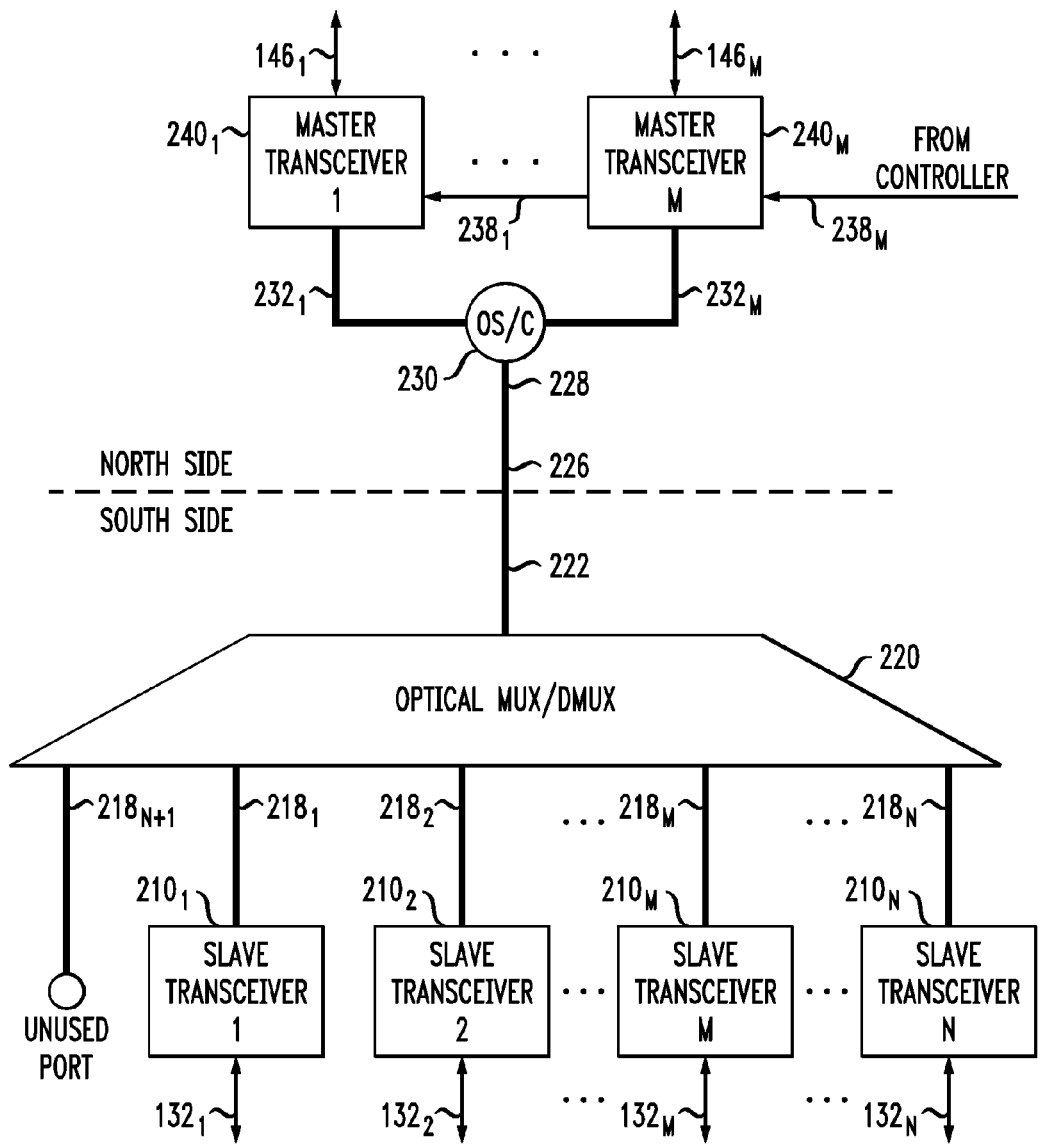
FIG. 2 shows a block diagram of an optical-transport subsystem that can be used in the communication system of FIG. 1 according to an embodiment of the disclosure.

FIG. 2 shows a block diagram of an optical-transport subsystem 200 that can be used to implement optical interconnect 140 (FIG. 1) according to an embodiment of the disclosure. More specifically, an example placement of subsystem 200 within system 100 (FIG. 1) is indicated in FIG. 2 by the labeling of the north and south input/output ports, which is the same as in FIG. 1. Master transceivers $240_1$-$240_M$ may form a part of input/output interface 144 (see FIG. 1). Slave transceivers $210_1$-$210_N$ may similarly form a part of input/output interface 136 (also see FIG. 1).

Slave transceivers $210_1$-$210_N$ are connected to plural ports $218_1$-$218_N$ of an optical multiplexer/de-multiplexer (MUX/DMUX) 220 as indicated in FIG. 2. MUX/DMUX 220 operates as an optical multiplexer for optical signals propagating in the northward direction, e.g., from any of plural ports $218_1$-$218_N$ to a common port 222. MUX/DMUX 220 operates as an optical de-multiplexer for optical signals propagating in the southward direction, e.g., from common port 222 to any of plural ports $218_1$-$218_N$.

Master transceivers $240_1$-$240_M$ are connected to plural ports $232_1$-$232_M$ of an optical splitter/combiner (OS/C) 230. In an example embodiment, OS/C 230 operates as an optical power splitter for optical signals propagating in the northward direction, e.g., from a common port 228 to plural ports $232_1$-$232_M$. OS/C 230 operates as an optical power combiner for optical signals propagating in the southward direction, e.g., from plural ports $232_1$-$232_M$ to common port 228. Common port 228 of OS/C 230 and common port 222 of MUX/DMUX 220 are connected by an optical bus 226. In an example embodiment, optical bus 226 comprises an optical fiber, an optical waveguide, and/or a fiber-optic cable.

Note that, in some embodiments, MUX/DMUX 220 may have one or more unused (unconnected) plural ports 218, as illustratively shown in FIG. 2 by the presence of an unused plural port $218_{N+1}$. As a result, optical-transport subsystem 200 can accommodate a potential expansion of cluster 102 (see FIG. 1). This expansion can be implemented, e.g., by connecting an additional slave transceiver 210 to plural port $218_{N+1}$, and then further connecting an additional network host 110, via a requisite NIC 120, to that additional slave transceiver 210. One of ordinary skill in the art will appreciate that such an expansion changes the oversubscription factor, e.g., from N:M to (N+1):M. One of ordinary skill in the art will also understand that, provided that MUX/DMUX 220 has a sufficiently large number of plural ports 218, the same physical apparatus of subsystem 200 can be (re)configured in a relatively straightforward manner to implement different levels of oversubscription, e.g., by changing the number of slave transceivers 210 connected to the plural ports of the MUX/DMUX 220. Thus, optical-transport subsystem 200 is scalable for different levels of oversubscription.

In an example embodiment, each master transceiver 240 may comprise the following elements (not explicitly shown in FIG. 2, see FIG. 5): (i) a respective tunable light source (e.g., a laser); (ii) a respective optical modulator configured to modulate an optical carrier generated by the light source using an electrical data signal received via the corresponding north port 146; and (iii) a respective coherent optical receiver configured to use an optical carrier generated by the light source as an optical local oscillator in the process of demodulating and decoding an optical signal received via the corresponding plural port 232 of OS/C 230. The wavelength tunability of the light source enables master transceiver 240 to transmit and receive optical signals with optical carriers located at any spectral position of the wavelength grid that defines the WDM multiplex used in subsystem 200. Note that the pass-through channels of MUX/DMUX 220 are also spectrally aligned with this wavelength grid. The output wavelengths generated by the tunable light sources in different master transceivers 240 are individually controlled by a controller, e.g., via control signals $238_1$-$238_M$. In an example configuration, at any given time, the tunable light sources in different master transceivers 240 operate to generate different respective wavelengths to ensure that no signal collisions occur in optical bus 226. In some embodiments, switch engine 150 (FIG. 1) may be configured to generate control signals $238_1$-$238_M$.

OS/C 230 is a passive optical splitter. When traversed in the northward direction, OS/C 230 splits the optical signal into multiple (attenuated) copies and delivers a respective one of the copies to each of master transceivers $240_1$-$240_M$. Note that each of the signal copies contains all of the WDM components applied to optical bus 226 by MUX/DMUX 220. Each master transceiver 240 is able to select for demodulation/decoding the WDM component intended for that particular transceiver by using a proper wavelength as a local oscillator for the optical receiver. For the optical signals traversing OS/C 230 in the southward direction, the OS/C operates as a conventional optical power combiner.

Optical bus 226 is configured to carry WDM signals between common port 228 of OS/C 230 and common port 222 of MUX/DMUX 220. In some embodiments, optical bus 226 may include one or more optical-gain elements, such as lumped or distributed optical amplifiers (not explicitly shown in FIG. 2) configured to amplify optical signals traveling in one or both directions.

In an example embodiment, MUX/DMUX 220 can be a conventional wavelength-division multiplexer/de-multiplexer. A WDM signal applied to common port 222 of MUX/DMUX 220 is de-multiplexed by MUX/DMUX 220 into the constituent WDM components, each of which then appears at the respective one of plural ports $218_1$-$218_N$. Each of the modulated optical signals applied to plural ports $218_1$-$218_N$ by slave transceivers $210_1$-$210_N$ is subjected in MUX/DMUX 220 to band-pass filtering with a particular band-pass profile, such as a super Gaussian profile. The resulting filtered WDM components are multiplexed to form a corresponding WDM signal, which is applied to optical bus 226 via common port 222.

In an example embodiment, each slave transceiver 210 may comprise the following elements (not explicitly shown in FIG. 2, see FIG. 6): (i) a respective optical receiver configured to detect optical signals received from the corresponding plural port 218 of MUX/DMUX 220 and (ii) a respective optical modulator configured to modulate an optical carrier of the received optical signal using an electrical data signal received via the corresponding south port 132. Note that slave transceivers 210 do not have their own light sources and, instead, are configured to modulate data onto the previously un-modulated dimensions of the incoming optical waveforms, which are then turned around in the northward direction and directed back to MUX/DMUX 220 for coupling into optical bus 226. A more detailed description of an example embodiment of slave transceiver 210 is given below in reference to FIG. 6.

Figure 3:
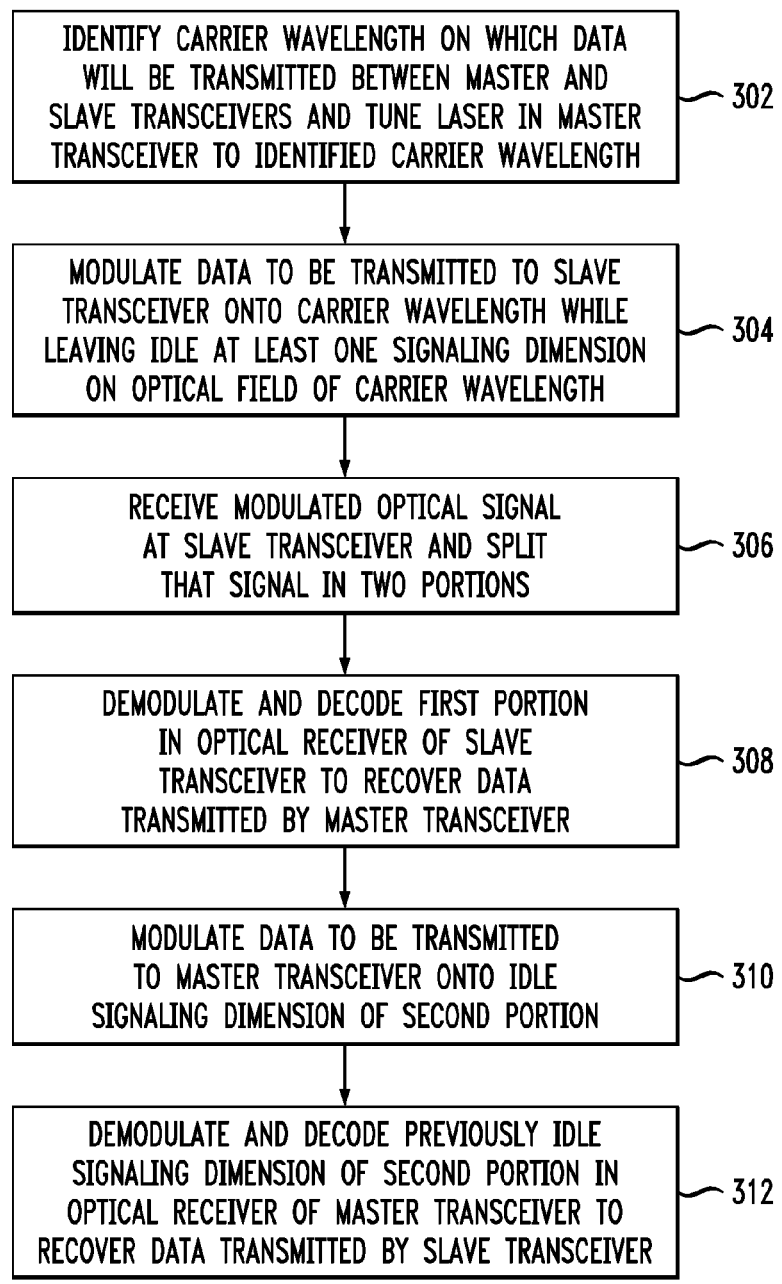
FIG. 3 shows a flowchart of a communication method that can be used in the optical-transport subsystem of FIG. 2 according to an embodiment of the disclosure.

FIG. 3 shows a flowchart of a communication method 300 that can be used in optical-transport subsystem 200 (FIG. 2) according to an embodiment of the disclosure. More specifically, method 300 is directed at establishing a bidirectional data flow between a master transceiver 240 and a slave transceiver 210 through optical-transport subsystem 200 (FIG. 2). The data optically transmitted by master transceiver 240 to slave transceiver 210 are supplied by a corresponding electrical signal received at the corresponding north port 146. The data optically received by master transceiver 240 from slave transceiver 210 are outputted via a corresponding electrical signal applied to the corresponding north port 146. The data optically transmitted by slave transceiver 210 to master transceiver 240 are supplied by a corresponding electrical signal received at the corresponding south port 132. The data optically received by slave transceiver 210 from master transceiver 240 are outputted via a corresponding electrical signal applied to the corresponding south port 132.

At step 302, master transceiver 240 receives control signal 238 that identifies the carrier wavelength on which the data will be transmitted between the master transceiver and the counterpart slave transceiver 210. In response to the received control signal 238, master transceiver 240 tunes the output wavelength of its light source to the identified carrier wavelength. Once the control circuitry of master transceiver 240 confirms that the output of the light source is at the correct wavelength, the processing of method 300 is directed to step 304.

At step 304, binary data received by master transceiver 240 through the corresponding north port 146 and appropriately framed according to the protocol in use (e.g. Ethernet) are modulated onto the carrier wavelength of step 302 using an optical modulator in the master transceiver. At least one of the signaling dimensions on the optical field of the carrier wavelength is left data free (unmodulated, idle) to be used later for carrying binary data from the counterpart slave transceiver 210 back to master transceiver 240. In an example embodiment, such a signaling dimension can be a selected polarization of light or a selected spatial mode of the corresponding optical fiber or waveguide. The resulting modulated optical signal is applied, via OS/C 230, to optical bus 226 for propagation in the southward direction.

At step 306, the counterpart slave transceiver 210 receives the modulated optical signal of step 304 through MUX/DMUX 220 and splits it in two portions. Note that the carrier wavelength of step 302 uniquely identifies the counterpart slave transceiver 210, and none of the other slave transceivers 210 receives that modulated optical signal due to the wavelength-specific signal routing performed by MUX/DMUX 220 for optical signals propagating in the southward direction.

At step 308, the first split portion of the received modulated optical signal is applied to an optical receiver in slave transceiver 210, where it is demodulated and decoded to recover the binary data sent at step 304. The recovered binary data are then outputted via the corresponding south port 132.

At step 310, binary data received by slave transceiver 210 through the corresponding south port 132 and appropriately framed according to the protocol in use are modulated onto an idle signaling dimension of the second split portion of the received modulated optical signal using an optical modulator in the slave transceiver. The resulting modulated optical signal is directed back to the corresponding plural port 218 of MUX/DMUX 220. MUX/DMUX 220 then directs that signal to optical bus 226 for propagation in the northward direction.

At step 312, master transceiver 240 receives the modulated optical signal of step 310 through OS/C 230. A coherent optical receiver in master transceiver 240 demodulates and decodes the received modulated optical signal to recover the binary data modulated onto the previously idle signaling dimension at step 310. One of ordinary skill in the art will understand that the use of the original carrier wavelength of step 302 as a local oscillator in the coherent optical receiver allows for WDM-component selection and efficient narrow-band filtering of the optical signal received by the master transceiver 240 through OS/C 230 even in the presence of many other WDM components. The recovered binary data are then outputted via the corresponding north port 146.

In various embodiments of method 300, any of the following optical modulation formats may be used for optical transmissions from a master transceiver 240 to a slave transceiver 210: (i) On-Off Keying (Non-Return-to-Zero or Return-to-Zero); (ii) Differential Phase Shift Keying; (iii) Higher Order Differential Phase Shift Keying, such as DQPSK; and (iv) Pulse Amplitude Modulation. Any of the following optical modulation formats may be used for optical transmissions from a slave transceiver 210 to a master transceiver 240: (i) On-Off Keying (Non-Return-to Zero or Return-to-Zero); (ii) Differential Phase Shift Keying; (iii) Higher Order Differential Phase Shift Keying, such as DQPSK; (iv) Pulse Amplitude Modulation; (v) Phase Shift Keying; (vi) Higher Order Phase Shift Keying, such as QPSK; (vii) Quadrature Amplitude Modulation (QAM); and (viii) Polarization Shift Keying.

Figure 4:
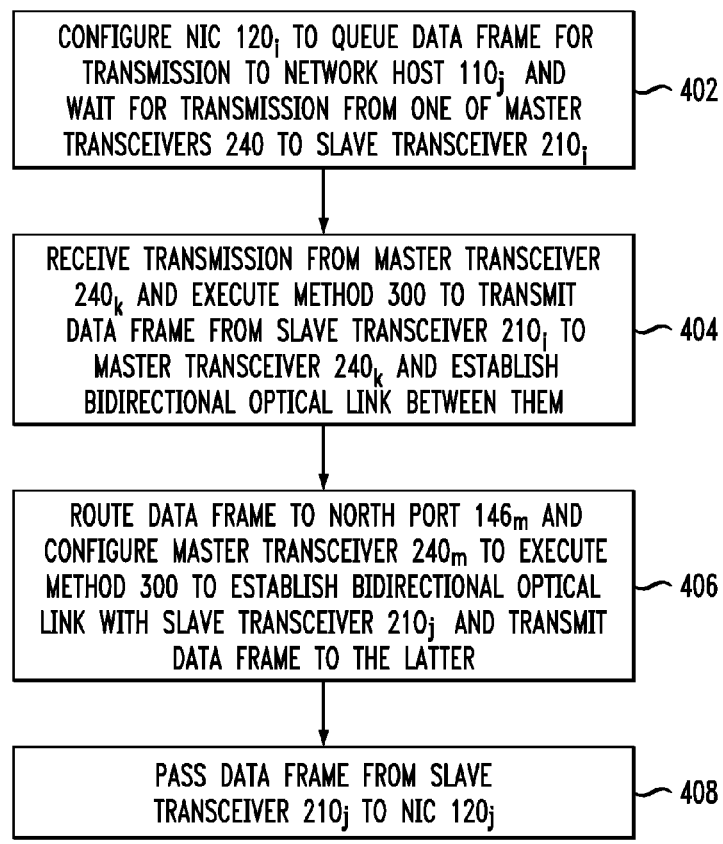
FIG. 4 shows a flowchart of a communication method that can be used in the communication system of FIG. 1 according to an embodiment of the disclosure.

FIG. 4 shows a flowchart of a communication method 400 that can be used in communication system 100 (FIG. 1) according to an embodiment of the disclosure. More specifically, method 400 is generally directed at establishing a bidirectional communication channel between network host $110_i$ and network host $110_j$ through communication fabric 104 (FIG. 1). For illustration purposes, method 400 is described in reference to an embodiment in which optical interconnect 140 is implemented using optical-transport subsystem 200 (FIG. 2). Based on the provided description, one of ordinary skill in the art will understand how to practice method 400 with alternative embodiments of communication fabric 104.

In the description that follows, it is assumed that network host $110_i$ has a data frame to transmit to network host $110_j$. As such, network host $110_i$ is the initiator, and network host $110_j$ is the responder. The execution of method 400 results, inter alia, in the transmission of the data frame from network host $110_i$ to network host $110_j$.

At step 402 of method 400, network host $110_i$ configures NIC $120_i$ to buffer in a queue a data frame containing the data to be transmitted to network host $110_j$. The header of the data frame has a MAC address of NIC $120_j$. At this point, NIC $120_i$ is ready to provide the queued data frame to slave transceiver $210_i$ for transmission to switch engine 150. However, as explained above, slave transceiver $210_i$ lacks an internal active light source (e.g., a laser) and has to wait for a transmission from one of master transceivers 240 to be able to transmit the data frame back to that master transceiver in order for that master transceiver to then pass the data frame onto switch engine 150.

At step 404, slave transceiver $210_i$ receives an optical signal from master transceiver $240_k$ and performs transmission of the queued data frame, e.g., by executing steps 306-310 of method 300 (FIG. 3). Master transceiver $240_k$ receives the corresponding modulated optical signal and executes step 312 of method 300 to pass the data frame onto switch engine 150. One of ordinary skill in the art will appreciate that a bidirectional data flow between slave transceiver $210_i$ and master transceiver $240_k$ can now be established by generally following method 300.

The initial transmission of the optical signal received by slave transceiver $210_i$ from master transceiver $240_k$ may take place under several possible scenarios. One possible scenario is that master transceiver $240_k$ has data to transmit to slave transceiver $210_i$ as a result of a data transmission received by switch engine 150 through L3 port 154 or one of north ports 146. Another possible scenario is that switch engine 150 configures master transceiver $240_k$ to execute a preset broadcast sequence. For example, based on a preset pattern, switch engine 150 may select up to M/2 master transceivers 240 for the broadcast, with different subsets of master transceivers selected at different times. The preset pattern may be selected such that slave transceiver $210_i$ is guaranteed to receive a transmission from a master transceiver 240 within a certain finite time period even when there are no queued payload data destined for slave transceiver $210_i$ at switch engine 150.

At step 406, switch engine 150 routes the data frame received at step 404 from north port $146_k$ to north port $146_m$ and configures master transceiver $240_m$ to execute method 300 to establish a bidirectional data flow with slave transceiver $210_j$. This enables master transceiver $240_m$, inter alia, to transmit the data frame to slave transceiver 210.

At step 408, slave transceiver $210_j$ passes the data frame onto NIC $120_j$, which then passes the data frame further to network host $110_j$. At this point, network host $110_j$ may respond to network host $110_i$ using the bidirectional communication channel established between slave transceiver $210_i$ and slave transceiver $210_j$. As indicated above, this bidirectional communication channel employs three distinct links. The first link is an optical link configured to support a bidirectional data flow between slave transceiver $210_i$ and master transceiver 240$_k$ through optical interconnect 140. The second link is an electrical link configured to support a bidirectional data flow between master transceiver 240$_k$ and master transceiver 240$_m$ through switch engine 150. The third link is an optical link configured to support a bidirectional data flow between master transceiver 240$_m$ and slave transceiver 210$_j$ through optical interconnect 140.

Multiple instances of method 400 may be run to establish up to M/2 bidirectional communication channels for M network hosts 110 (arranged in M/2 pairs, each corresponding to a respective one of the M/2 bidirectional communication channels). Once these up to M/2 bidirectional communication channels are established, communication fabric 104 may operate as a fully switchable network for the corresponding M network hosts 110. The switching in this switchable network can be performed, e.g., by electrically switching, in switch engine 150, the second links of the established M/2 bidirectional communication channels, without tearing down or even altering the corresponding first and third links (established through optical interconnect 140) of these M/2 bidirectional communication channels. One of ordinary skill in the art will appreciate that the electrically switchable network may be operable only for limited periods of time, e.g., because the set of the first and/or third links through optical interconnect 140 may need to be altered, from time to time, to allow one or more of the other (N–M) network hosts 110 to also communicate via communication fabric 104.

For example, switch engine 150 may be reconfigured (electrically switched) to cause north port 146$_m$ to receive data from north port 146$_q$ (where q≠k) instead of receiving data from north port 146$_k$, as in the previous instance of step 406. Switch engine 150 may be further reconfigured in a similar manner to change the end ports of one or more of the other active second links to implement the electrical switching in the above-described, temporarily established electrically switchable network.

Figure 5:
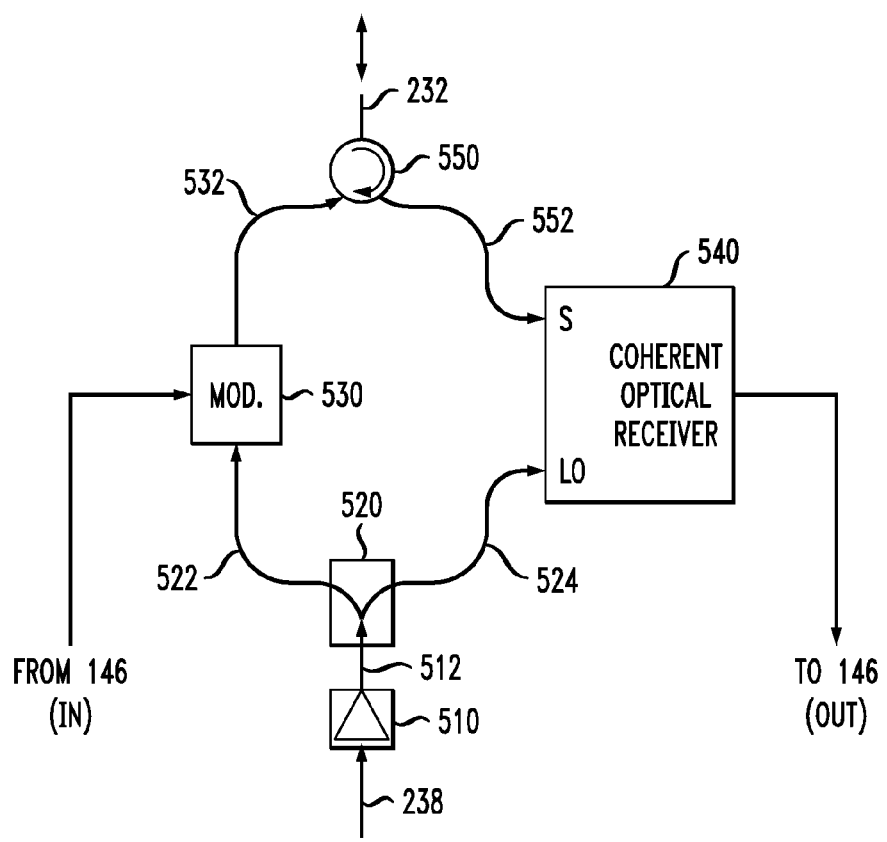
FIG. 5 shows a block diagram of an optical transceiver that can be used as a master transceiver in the optical-transport subsystem FIG. 2 according to an embodiment of the disclosure.

FIG. 5 shows a block diagram of an optical transceiver 500 that can be used as a master transceiver 240 (FIG. 2) according to an embodiment of the disclosure. For illustration purposes, transceiver 500 is shown in a configuration corresponding to that of one of master transceivers 240, as shown in FIG. 2. Alternative configurations of transceiver 500 are also contemplated.

Transceiver 500 comprises a tunable laser 510 whose output wavelength can be tuned using an appropriate control signal, such as one of control signals 238$_1$-238$_M$ (FIG. 2). An optical splitter 520 operates to split an optical output signal 512 generated by laser 510 into two portions, 522 and 524, and apply them to an optical modulator 530 and a local-oscillator (LO) input port of a coherent optical receiver 540, respectively. Modulator 530 operates to modulate portion 522 with data received from north port 146, while leaving unmodulated (idle) one of the signaling dimensions of the optical carrier wave therein. For example, modulator 530 may modulate the X polarization of portion 522 with the data while leaving unmodulated the Y polarization thereof. An optical circulator 550 is configured to direct a resulting modulated optical signal 532 to the corresponding plural port 232 of OS/C 230.

Optical circulator 550 also operates to redirect a modulated optical signal received through plural port 232, e.g., from one of slave transceivers 210 (FIG. 2), to a signal (S) input port of coherent optical receiver 540. This redirected optical signal is labeled 552 in FIG. 5. Recall that one of the signaling dimensions of signal 552 may carry data intended for transceiver 500. For example, the Y polarization of signal 552 may carry the data transmitted by the counterpart slave transceiver 210, whereas the X polarization of that signal may have been previously modulated with data in modulator 530. Coherent optical receiver 540 uses portion 524 as a local-oscillator signal to detect and decode signal 552 as known in the art. The data recovered by receiver 540 from a relevant signaling dimension (e.g., the Y polarization) of signal 552 are then directed to north port 146.

Figure 6:
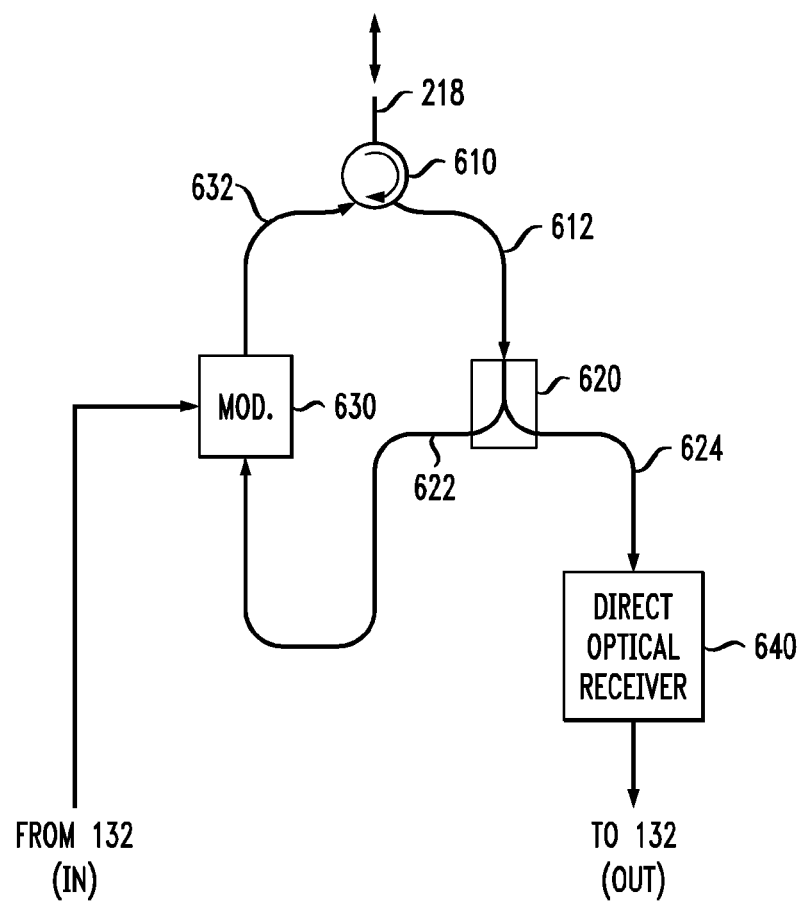
FIG. 6 shows a block diagram of an optical transceiver that can be used as a slave transceiver in the optical-transport subsystem FIG. 2 according to an embodiment of the disclosure.

FIG. 6 shows a block diagram of an optical transceiver 600 that can be used as a slave transceiver 210 (FIG. 2) according to an embodiment of the disclosure. For illustration purposes, transceiver 600 is shown in a configuration corresponding to that of one of slave transceivers 210, as shown in FIG. 2. Alternative configurations of transceiver 600 are also contemplated.

Transceiver 600 comprises an optical circulator 610 that is configured to redirect a modulated optical signal received through plural port 218 of MUX/DMUX 220. This redirected optical signal is labeled 612 in FIG. 6. An optical splitter 620 operates to split signal 612 into two portions, 622 and 624, and apply them to an optical modulator 630 and an optical receiver 640, respectively. Recall that at least one of signaling dimensions in signal 612, and therefore in portion 622, is unmodulated (idle). Modulator 630 operates to modulate the at least one of the unmodulated signaling dimensions of portion 622 with data received from south port 132. For example, modulator 630 may modulate the Y polarization of portion 622 if the counterpart master transceiver 240 has modulated the X polarization and left the Y polarization unmodulated. Optical circulator 610 is configured to direct a resulting modulated optical signal 632 back to plural port 218 of MUX/DMUX 220.

Optical receiver 640 is configured to use direct optical detection to detect and decode portion 624 as known in the art. The data recovered by receiver 640 from a relevant signaling dimension (e.g., the X polarization) of portion 624 are then directed to south port 132.

According to an example embodiment disclosed above in reference to FIGS. 1-6, provided is an apparatus (e.g., 100, FIG. 1) comprising: an optical interconnect (e.g., 140, FIG. 1; 200, FIG. 2) having N first ports (e.g., 132$_1$-132$_N$, FIGS. 1-2) and M second ports (e.g., 146$_1$-146$_M$, FIGS. 1-2) and configured to connect any of the N first ports and any of the M second ports in a manner that supports a respective bidirectional data flow between a pair of connected ports therein, wherein the optical interconnect is configurable to support at most M bidirectional data flows for a subset of the N first ports, where M and N are positive integers, N>M, and M is greater than one; and an electrical switch engine (e.g., 150, FIG. 1) connected to the M second ports of the optical interconnect and configured to electrically connect any of the M second ports and any other of the M second ports in a manner that supports a respective bidirectional data flow between a pair of connected second ports therein. The apparatus is configured to support a bidirectional data flow between any two of the N first ports (e.g., 132$_i$ and 132$_j$, FIGS. 1-2) using a respective communication channel established through the optical interconnect and the electrical switch engine.

In some embodiments of the above apparatus, the respective communication channel comprises: a respective first optical link through the optical interconnect between a first (e.g., 132$_i$, FIGS. 1-2) of said any two of the N first ports and a selected one (e.g., 146$_k$, FIGS. 1-2) of the M second ports; a respective electrical link through the electrical switch engine between said selected one of the M second ports and another selected one (e.g., 146$_m$, FIGS. 1-2) of the M second ports; and a respective second optical link through the optical interconnect between said another selected one of the M second ports and a second (e.g., $132_j$, FIGS. 1-2) of said any two of the N first ports.

In some embodiments of any of the above apparatus, the optical interconnect comprises a first interface (e.g., 144, FIG. 1) configured to perform signal inter-conversion between electrical and optical domains to enable data transfer: (i) between the respective first optical link and the respective electrical link, and (ii) between the respective electrical link and the respective second optical link.

In some embodiments of any of the above apparatus, the apparatus further comprises a plurality of electrical network interface cards (e.g., 120, FIG. 1), each coupled to a respective one of the N first ports, wherein the optical interconnect comprises a second interface (e.g., 136, FIG. 1) configured to perform signal inter-conversion between electrical and optical domains to enable data transfer between the plurality of the electrical network interface cards and the optical interconnect.

In some embodiments of any of the above apparatus, the apparatus further comprises a plurality of network hosts, each configured to communicate with other network hosts through a respective one of the plurality of the electrical network interface cards.

In some embodiments of any of the above apparatus, the apparatus is configurable to support no more than M/2 bidirectional data flows, each between a respective pair of the N first ports.

In some embodiments of any of the above apparatus, the electrical switch engine has a third port (e.g., 154, FIG. 2) and is further configured to electrically connect any of the M second ports and the third port.

In some embodiments of any of the above apparatus, the apparatus is configured to dynamically change in time the subset of the N first ports configured to handle said at most M bidirectional data flows.

In some embodiments of any of the above apparatus, the optical interconnect comprises: a first plurality of optical transceivers (e.g., 210, FIG. 2), each coupled to a respective one of the N first ports and configured to (i) optically transmit, through the optical interconnect, data electrically received through said respective one of the N first ports and (ii) electrically output through said respective one of the N first ports data optically received through the optical interconnect; and a second plurality of optical transceivers (e.g., 240, FIG. 2), each coupled to a respective one of the M second ports and configured to (i) optically transmit, through the optical interconnect, data electrically received through said respective one of the M second ports and (ii) electrically output through said respective one of the M second ports data optically received through the optical interconnect.

In some embodiments of any of the above apparatus, the optical interconnect further comprises an optical multiplexer/de-multiplexer (e.g., 220, FIG. 2) having a common optical port (e.g., 222, FIG. 2) and a plurality of plural optical ports (e.g., 218, FIG. 2) and configured to route optical signals between the common optical port and the plurality of plural optical ports based on carrier wavelengths of the optical signals, wherein each of the first plurality of the optical transceivers is directly optically coupled to a respective one of the plural optical ports of the optical multiplexer/de-multiplexer.

In some embodiments of any of the above apparatus, at least one (e.g., $218_{N+1}$, FIG. 2) of the plural ports of the optical multiplexer/de-multiplexer does not have directly connected thereto an optical transceiver of the first plurality of the optical transceivers.

In some embodiments of any of the above apparatus, the optical interconnect is configured for an oversubscription factor of N:M; and the optical interconnect is reconfigurable for an oversubscription factor of greater than N:M (e.g., (N+1):M) by having connected to said at least one of the plural ports of the optical multiplexer/de-multiplexer an additional optical transceiver.

In some embodiments of any of the above apparatus, the optical interconnect further comprises: an optical power splitter/combiner (e.g., 230, FIG. 2) having a common optical port (e.g., 228, FIG. 2) and a plurality of plural optical ports (e.g., 232, FIG. 2) and configured to (i) split optical power applied to the common optical port thereof into a plurality of split portions, each being directed to a respective one of the plural optical ports thereof, and (ii) combine optical power applied to the plural optical ports thereof and apply a resulting combined optical power to the common optical port thereof; and an optical bus (e.g., 226, FIG. 2) configured to optically connect the common optical port of the optical power splitter/combiner and the common optical port of the optical multiplexer/de-multiplexer.

In some embodiments of any of the above apparatus, each of the second plurality of the optical transceivers is directly optically coupled to a respective one of the plural optical ports of the optical power splitter/combiner.

In some embodiments of any of the above apparatus, each of the second plurality of the optical transceivers comprises a respective laser (e.g., 510, FIG. 5) whose output wavelength is controllably tunable to any of a plurality of WDM carrier wavelengths employed in the optical interconnect.

In some embodiments of any of the above apparatus, none of the first plurality of the optical transceivers includes an internal active light source.

In some embodiments of any of the above apparatus, each of the first plurality of the optical transceivers includes a respective optical modulator (e.g., 630, FIG. 6) configured to modulate with data an unmodulated signaling dimension of a modulated optical signal received from an optical transceiver of the second plurality of the optical transceivers, wherein the data is received electrically through the respective one of the N first ports.

In some embodiments of any of the above apparatus, each of the second plurality of the optical transceivers further comprises: a respective optical splitter (e.g., 520, FIG. 5) configured to split an optical carrier (e.g., 512, FIG. 5) generated by the respective laser into a first portion (e.g., 522, FIG. 5) and a second portion (e.g., 524, FIG. 5); a respective optical modulator (e.g., 530, FIG. 5) configured to modulate the first portion with data received through the respective one of the M second ports, and further configured to leave unmodulated a selected signaling dimension of the optical carrier in the first portion; and a respective optical receiver (e.g., 540, FIG. 5) configured to use the second portion as an optical local oscillator for coherently detecting and recovering data from a modulated optical signal received through the optical interconnect, and further configured to electrically output recovered data through the respective one of the M second ports.

In some embodiments of any of the above apparatus, the selected signaling dimension is one (e.g., Y) of two orthogonal polarizations of the optical carrier in the first portion.

In some embodiments of any of the above apparatus, each of the first plurality of the optical transceivers comprises: a respective optical splitter (e.g., 620, FIG. 6) configured to split a modulated optical signal (e.g., 612, FIG. 6) received through the optical interconnect into a first portion (e.g., 622, FIG. 6) and a second portion (e.g., 624, FIG. 6); a respective optical modulator (e.g., e.g., 630, FIG. 6) configured to modulate an unmodulated signaling dimension of the first portion with data received through the respective one of the N first ports, and further configured to transmit a resulting modulated optical signal through the optical interconnect; and a respective optical receiver (e.g., 640, FIG. 6) configured to apply direct optical detection to the second portion to recover data encoded in the modulated optical signal received through the optical interconnect, and further configured to electrically output recovered data through the respective one of the N first ports.

According to another example embodiment disclosed above in reference to FIGS. 1-6, provided is a communication method (e.g., 300, FIG. 3; 400, FIG. 4) executed at a first optical transceiver (e.g., 240, FIG. 2), the method comprising the steps of: generating (e.g., as in 302, FIG. 3) a first optical carrier wave (e.g., 512, FIG. 5) using a laser (e.g., 510, FIG. 5) located at the first optical transceiver; generating (e.g., 304, FIG. 3) a first modulated optical signal by modulating first data to be transmitted to a second optical transceiver (e.g., 210, FIG. 2) onto the first optical carrier wave while leaving unmodulated a selected signaling dimension of the first optical carrier wave in the first modulated optical signal; receiving from the second optical transceiver a second modulated optical signal having the first optical carrier wave, wherein the selected signaling dimension has been modulated (e.g., 310, FIG. 3) with second data at the second optical transceiver; and recovering (e.g., 312, FIG. 3) the second data by optically detecting the second modulated optical signal while using a portion of the first optical carrier wave generated using the laser as a local oscillator signal for said optically detecting.

In some embodiments of the above method, the method further comprises tuning (e.g., 302, FIG. 3) the laser located at the first optical transceiver to generate a second optical carrier wave instead of the first optical carrier wave, wherein the second carrier wave has a carrier wavelength that is different from a carrier wavelength of the first carrier wave.

In some embodiments of any of the above methods, the method further comprises: generating (e.g., another instance of 304, FIG. 3) a third modulated optical signal by modulating third data to be transmitted to a third optical transceiver onto the second optical carrier wave while leaving unmodulated a selected signaling dimension of the second optical carrier wave in the third modulated optical signal; receiving from the third optical transceiver a fourth modulated optical signal having the second optical carrier wave, wherein the selected signaling dimension has been modulated (e.g., another instance of 310, FIG. 3) with fourth data at the third optical transceiver; and recovering (e.g., another instance of 312, FIG. 3) the fourth data by optically detecting the fourth modulated optical signal while using a portion of the second optical carrier wave generated using the laser as a local oscillator signal for said optically detecting the fourth modulated optical signal.

In some embodiments of any of the above methods, the step of generating the first modulated optical signal comprises modulating the first data onto a first (e.g., X) polarization of the first optical carrier wave while leaving unmodulated a second (e.g., Y) polarization of the first optical carrier wave of the first modulated optical signal.

In some embodiments of any of the above methods, the step of receiving comprises receiving from the second optical transceiver the second modulated optical signal having the first optical carrier wave, wherein the second polarization has been modulated with the second data at the second optical transceiver.

In some embodiments of any of the above methods, the step of recovering comprises recovering the second data using the second polarization of the second modulated optical signal.

In some embodiments of any of the above methods, the first polarization of the second modulated optical signal carries a portion of the first optical carrier wave previously modulated with the first data at the first optical transceiver.

In some embodiments of any of the above methods, the step of generating the first modulated optical signal comprises modulating the first data onto the first optical carrier wave in a manner that causes: (i) a first spatial mode in an optical fiber or a fiber-optic cable (e.g., 226, FIG. 2) to carry a portion of the first optical carrier wave modulated with the first data; and (ii) a second spatial mode in the optical fiber or the fiber-optic cable to carry an unmodulated portion of the first optical carrier wave.

In some embodiments of any of the above methods, the step of receiving comprises receiving from the second optical transceiver, through the optical fiber or the fiber-optic cable, the second modulated optical signal having the first optical carrier wave. The second spatial mode is configured to carry a portion of the first optical carrier wave of the second modulated optical signal that has been modulated with the second data at the second optical transceiver. The first spatial mode is configured to carry a portion of the first optical carrier wave of the second modulated optical signal that has been previously modulated with the first data at the first optical transceiver.

In some embodiments of any of the above methods, the step of recovering comprises recovering the second data using the portion of the first optical carrier wave of the second modulated optical signal that has been modulated with the second data at the second optical transceiver.

In some embodiments of any of the above methods, the step of generating the first modulated optical signal is part of a preset broadcast sequence, wherein the first optical transceiver is configured to transmit pilot data as the first data when the first optical transceiver has no payload data to transmit to the second optical transceiver.

In some embodiments of any of the above methods, the preset broadcast sequence is configured to guarantee that the second optical transceiver is to receive an optical transmission within a predetermined finite time interval regardless of whether or not there are payload data to transmit to the second optical transceiver.

In some embodiments of any of the above methods, the method further comprises receiving (e.g., as in 406, FIG. 4) a portion of the first data through an electrical input port (e.g., 146$_m$, FIGS. 1, 2) coupled to an electrical switch engine (e.g., 150, FIG. 1) from an electrical output port (e.g., 146$_k$, FIGS. 1, 2) of a third optical transceiver coupled to the electrical switch engine.

In some embodiments of any of the above methods, the method further comprises receiving (e.g., as in another instance of 406, FIG. 4) another portion of the first data through the electrical input port from an electrical output port (e.g., 146$_q$, FIGS. 1, 2) of a fourth optical transceiver coupled to the electrical switch engine.

In some embodiments of any of the above methods, each of the first, second, and third optical transceivers is coupled to a different respective optical port of an optical interconnect (e.g., 140, FIG. 1; 200, FIG. 2).

In some embodiments of any of the above methods, the step of receiving the second modulated optical signal comprises receiving the second modulated optical signal through the optical interconnect.

In some embodiments of any of the above methods, the method further comprises transmitting the first modulated optical signal to the second optical transceiver through the optical interconnect.

According to yet another example embodiment disclosed above in reference to FIGS. 1-6, provided is a communication method (e.g., 300, FIG. 3; 400, FIG. 4) executed at a second optical transceiver (e.g., 210, FIG. 2), the method comprising the steps of: receiving (e.g., as in 306, FIG. 3) from a first optical transceiver (e.g., 240, FIG. 2) a first optical signal having modulated with first data in a manner that causes a selected signaling dimension of the first optical signal to be unmodulated with data; optically splitting (e.g., as in 306, FIG. 3) the first optical signal to generate a first split portion and a second split portion; recovering (e.g., as in 308, FIG. 3) the first data by optically detecting the first split portion; generating (e.g., as in 310, FIG. 3) a second optical signal by modulating second data onto the selected signaling dimension of the second split portion; and transmitting the second optical signal back to the first optical transceiver.

In some embodiments of the above method, the method further comprises: receiving (e.g., as in another instance of 306, FIG. 3) from a third optical transceiver (e.g., another 240, FIG. 2) a third optical signal modulated with third data in a manner that causes a selected signaling dimension of the third modulated optical signal to be unmodulated with data; optically splitting (e.g., as in another instance of 306, FIG. 3) the third optical signal to generate a first split portion and a second split portion thereof; recovering (e.g., as in another instance of 308, FIG. 3) the third data by optically detecting the first split portion of the third optical signal; generating (e.g., as in another instance of 310, FIG. 3) a fourth optical signal by modulating fourth data onto the selected signaling dimension of the second split portion of the third optical signal; and transmitting the fourth optical signal back to the third optical transceiver.

In some embodiments of any of the above methods, the fourth optical signal is also transmitted to the first optical transceiver.

In some embodiments of any of the above methods, the step of transmitting comprises broadcasting the second optical signal to a set of two or more optical transceivers (e.g., 240$_1$-240$_M$, FIG. 2) wherein the set includes the first optical transceiver.

In some embodiments of any of the above methods, the selected signaling dimension is a first (e.g., X) polarization; and a second (e.g., Y) polarization of the first optical signal is modulated with the first data.

While this disclosure includes references to illustrative embodiments, this specification is not intended to be construed in a limiting sense.

In some embodiments, M may be the same as N, i.e., M=N. In some embodiments, M may be odd.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
an optical interconnect having N first ports and M second ports and configured to connect any of the N first ports and any of the M second ports in a manner that supports a respective bidirectional data flow between a pair of connected ports therein, wherein the optical interconnect is configurable to support at most M bidirectional data flows for a subset of the N first ports, where M and N are positive integers, N>M, and M is greater than one; and
an electrical switch engine connected to the M second ports of the optical interconnect and configured to electrically connect any of the M second ports and any other of the M second ports in a manner that supports a respective bidirectional data flow between a pair of connected second ports therein; and
wherein the apparatus is configured to support a bidirectional data flow between any two of the N first ports using a respective communication channel established through the optical interconnect and the electrical switch engine.

2. The apparatus of claim 1, wherein the respective communication channel comprises:
a respective first optical link through the optical interconnect between a first of said any two of the N first ports and a selected one of the M second ports;
a respective electrical link through the electrical switch engine between said selected one of the M second ports and another selected one of the M second ports; and
a respective second optical link through the optical interconnect between said another selected one of the M second ports and a second of said any two of the N first ports.

3. The apparatus of claim 2, wherein the optical interconnect comprises a first interface configured to perform signal inter-conversion between electrical and optical domains to enable data transfer:
between the respective first optical link and the respective electrical link, and
between the respective electrical link and the respective second optical link.

4. The apparatus of claim 3, further comprising a plurality of electrical network interface cards, each coupled to a respective one of the N first ports, wherein the optical interconnect comprises a second interface configured to perform signal inter-conversion between electrical and optical domains to enable data transfer between the plurality of the electrical network interface cards and the optical interconnect.

5. The apparatus of claim 4, further comprising a plurality of network hosts, each configured to communicate with other network hosts through a respective one of the plurality of the electrical network interface cards.

6. The apparatus of claim 1, wherein the apparatus is configurable to support no more than M/2 bidirectional data flows, each between a respective pair of the N first ports.

7. The apparatus of claim 1, wherein the electrical switch engine has a third port and is further configured to electrically connect any of the M second ports and the third port.

8. The apparatus of claim 1, wherein the apparatus is configured to dynamically change in time the subset of the N first ports configured to handle said at most M bidirectional data flows.

9. The apparatus of claim 1, wherein the optical interconnect comprises:
a first plurality of optical transceivers, each coupled to a respective one of the N first ports and configured to (i) optically transmit, through the optical interconnect, data electrically received through said respective one of the N first ports and (ii) electrically output through said respective one of the N first ports data optically received through the optical interconnect; and
a second plurality of optical transceivers, each coupled to a respective one of the M second ports and configured to (i) optically transmit, through the optical interconnect, data electrically received through said respective one of the M second ports and (ii) electrically output through said respective one of the M second ports data optically received through the optical interconnect.

10. The apparatus of claim 9, wherein the optical interconnect further comprises an optical multiplexer/de-multiplexer having a common optical port and a plurality of plural optical ports and configured to route optical signals between the common optical port and the plurality of plural optical ports based on carrier wavelengths of the optical signals, wherein each of the first plurality of the optical transceivers is directly optically coupled to a respective one of the plural optical ports of the optical multiplexer/de-multiplexer.

11. The apparatus of claim 10, wherein at least one of the plural ports of the optical multiplexer/de-multiplexer does not have directly connected thereto an optical transceiver of the first plurality of the optical transceivers.

12. The apparatus of claim 11,
wherein the optical interconnect is configured for an oversubscription factor of N:M; and
wherein the optical interconnect is reconfigurable for an oversubscription factor of greater than N:M by having connected to said at least one of the plural ports of the optical multiplexer/de-multiplexer an additional optical transceiver.

13. The apparatus of claim 10, wherein the optical interconnect further comprises:
an optical power splitter/combiner having a common optical port and a plurality of plural optical ports and configured to (i) split optical power applied to the common optical port thereof into a plurality of split portions, each being directed to a respective one of the plural optical ports thereof, and (ii) combine optical power applied to the plural optical ports thereof and apply a resulting combined optical power to the common optical port thereof; and
an optical bus configured to optically connect the common optical port of the optical power splitter/combiner and the common optical port of the optical multiplexer/de-multiplexer.

14. The apparatus of claim 13, wherein each of the second plurality of the optical transceivers is directly optically coupled to a respective one of the plural optical ports of the optical power splitter/combiner.

15. The apparatus of claim 9, wherein each of the second plurality of the optical transceivers comprises a respective laser whose output wavelength is controllably tunable to any of a plurality of WDM carrier wavelengths employed in the optical interconnect.

16. The apparatus of claim 15, wherein none of the first plurality of the optical transceivers includes an internal active light source.

17. The apparatus of claim 15, wherein each of the first plurality of the optical transceivers includes a respective optical modulator configured to modulate with data an unmodulated signaling dimension of a modulated optical signal received from an optical transceiver of the second plurality of the optical transceivers, wherein the data is received electrically through the respective one of the N first ports.

18. The apparatus of claim 15, wherein each of the second plurality of the optical transceivers further comprises:
- a respective optical splitter configured to split an optical carrier generated by the respective laser into a first portion and a second portion;
- a respective optical modulator configured to modulate the first portion with data received through the respective one of the M second ports, and further configured to leave unmodulated a selected signaling dimension of the optical carrier in the first portion; and
- a respective optical receiver configured to use the second portion as an optical local oscillator for coherently detecting and recovering data from a modulated optical signal received through the optical interconnect, and further configured to electrically output recovered data through the respective one of the M second ports.

19. The apparatus of claim 18, wherein the selected signaling dimension is one of two orthogonal polarizations of the optical carrier in the first portion.

20. The apparatus of claim 9, wherein each of the first plurality of the optical transceivers comprises:
- a respective optical splitter configured to split a modulated optical signal received through the optical interconnect into a first portion and a second portion;
- a respective optical modulator configured to modulate an unmodulated signaling dimension of the first portion with data received through the respective one of the N first ports, and further configured to transmit a resulting modulated optical signal through the optical interconnect; and
- a respective optical receiver configured to apply direct optical detection to the second portion to recover data encoded in the modulated optical signal received through the optical interconnect, and further configured to electrically output recovered data through the respective one of the N first ports.

* * * * *